US012795279B2

(12) United States Patent
Bennett et al.

(10) Patent No.: US 12,795,279 B2
(45) Date of Patent: Nov. 10, 2026

(54) WEARABLE AUDIO DEVICE WITH EXTENDED STANDBY POWER STATE

(71) Applicant: Bose Corporation, Framingham, MA (US)

(72) Inventors: Theodore Edward Bennett, Brookline, NH (US); Naren Reddy Palupunoori, Holliston, MA (US); John Patrick New, Cambridge, MA (US)

(73) Assignee: Bose Corporation, Framingham, MA (US)

( * ) Notice: Subject to any disclaimer, the term of this patent is extended or adjusted under 35 U.S.C. 154(b) by 148 days.

(21) Appl. No.: 18/670,849

(22) Filed: May 22, 2024

(65) Prior Publication Data

US 2025/0365523 A1 Nov. 27, 2025

(51) Int. Cl.
*H04R 1/10* (2026.01)
*G06F 1/26* (2006.01)
*G06F 1/3231* (2019.01)
*G06F 1/3296* (2019.01)
*H04R 3/00* (2006.01)

(52) U.S. Cl.
CPC ............... *H04R 1/10* (2013.01); *G06F 1/263* (2013.01); *G06F 1/3231* (2013.01); *G06F 1/3296* (2013.01); *H04R 3/00* (2013.01); *H04R 2460/03* (2013.01)

(58) Field of Classification Search
CPC ........ H04R 1/10; H04R 3/00; H04R 2460/03; H04R 5/033; G06F 1/263; G06F 1/3231; G06F 1/3296
USPC ................................ 381/74, 384; 455/575.2
See application file for complete search history.

(56) References Cited

U.S. PATENT DOCUMENTS 5,144,678 A * 9/1992 Lenz .................... H04R 1/1041 381/384
7,945,297 B2 * 5/2011 Philipp .................... H04R 1/10 455/575.2
8,335,312 B2 * 12/2012 Gerhardt ............. H04R 1/1041 381/74
10,085,081 B2 * 9/2018 Woo ..................... H04R 1/1041
10,812,888 B2 10/2020 Ueda
11,089,415 B1 * 8/2021 Lesso ....................... H04R 3/00
11,528,549 B2 * 12/2022 Wu ...................... H04R 1/1041
2015/0281825 A1 * 10/2015 Johnson .................. H04R 5/04 381/74
2016/0100248 A1 * 4/2016 Mehrabi .............. G06F 1/3215 381/384
2017/0374448 A1 * 12/2017 Patel ................... H04R 29/001
2021/0377680 A1 12/2021 Lesso
2022/0382382 A1 12/2022 Kananen
2022/0400329 A1 12/2022 Kemmerer et al.
(Continued)

OTHER PUBLICATIONS

Michal Calore, "Review: Parrot Zik Headphones," Gear, Jul. 3, 2012, 7 pages, https://www.wired.com/2012/07/parrot-zik/.
(Continued)

*Primary Examiner* — Xu Mei
(74) *Attorney, Agent, or Firm* — Hoffman Warnick LLC

(57) ABSTRACT

Aspects include approaches for managing power states in wearable audio devices, along with wearable audio devices with such capabilities. In certain cases, a wearable audio device includes separate power supplies for managing distinct capabilities of the device. The wearable audio device is operable in multiple power states.

20 Claims, 4 Drawing Sheets

400

| Power State | Controller Active? | Controller Powered? | On-Head Powered? |
|---|---|---|---|
| 1 - Active | Y | Y | Y |
| 2A – Hibernate | N | Y | Y |
| 2 – Standby (Shelf) | N | N | Y |
| 3 - Reserve (Ship) | N | N | N |

(56) References Cited

U.S. PATENT DOCUMENTS

| | | | | |
|---|---|---|---|---|
| 2023/0063120 | A1 | 3/2023 | Elian et al. | |
| 2023/0262375 | A1* | 8/2023 | LeBlanc | H04R 1/1041 381/74 |
| 2023/0337981 | A1* | 10/2023 | Srinivasan | G06F 1/3215 |

OTHER PUBLICATIONS

The Elegant and Complex Parrot Zik Bluetooth Noise Canceling Headset p. 2 _ Stereophile.com, Headphone Reviews, https://www.stereophile.com/content/elegant-and-complex-parrot-zik-bluetooth-noise-canceling-headset-page-2, 8 pages.

Parrot Zik, Quick Start Guideuk-fr-sp-de-it-nl-, design by S+ARCK, 112 pages.

Parrot Zik 2.0, User Guide_uk, 22 pages.

PCT International Search Report and Written Opinion for International Application No. PCT/US2025/026975, dated Aug. 12, 2025, 8 pages.

* cited by examiner

400

| Power State | Controller Active? | Controller Powered? | On-Head Powered? |
|---|---|---|---|
| 1 - Active | Y | Y | Y |
| 2A – Hibernate | N | Y | Y |
| 2 – Standby (Shelf) | N | N | Y |
| 3 – Reserve (Ship) | N | N | N |

FIG. 4

WEARABLE AUDIO DEVICE WITH EXTENDED STANDBY POWER STATE

TECHNICAL FIELD

This disclosure relates to wearable audio devices and related control methods. In particular, this disclosure relates to controlling power states in wearable audio devices.

BACKGROUND

In an effort to reduce battery usage, conventional wearable audio devices have been designed to operate in multiple power states. Some of these devices utilize a sleep or hibernate mode to reduce power consumption but remain available for usage on short notice. However, these sleep or hibernate modes are typically short-term, and use significant processing capabilities, as well as associated battery power. As such, many of these conventional devices are either too power hungry, insufficiently responsive, or both.

SUMMARY

Various implementations are directed to approaches for managing power states in wearable audio devices, along with wearable audio devices with such capabilities. In certain cases, a wearable audio device includes separate power supplies for managing distinct capabilities of the device.

A first aspect includes a wearable audio device including: an electro-acoustic transducer for providing an audio output; a controller coupled with the electro-acoustic transducer; a first power supply coupled with the controller; an on-head detection system coupled with the controller; and a second power supply coupled with the on-head detection system, the second power supply being independent of the first power supply, where the wearable audio device is operable in multiple power states.

A second aspect includes a method of controlling a wearable audio device including, an electro-acoustic transducer for providing an audio output, a controller coupled with the electro-acoustic transducer, a first power supply coupled with the controller, an on-head detection system coupled with the controller, and a second power supply coupled with the on-head detection system, the second power supply being independent of the first power supply, the method including: switching between power states in response to at least one of an elapsed timer or an on-head event determined by the on-head detection system.

All examples and features mentioned below can be combined in any technically possible way.

In some cases, the multiple power states include at least three distinct power states. In various implementations, a reset power state or equivalent is in addition to the at least three distinct power states.

In certain aspects, a first one of the power states includes an active power state whereby the controller is powered on by the first power supply and actively controlling the electro-acoustic transducer, a second one of the power states includes a standby power state whereby the controller is powered off and the on-head detection system is powered on by the second power supply, and a third one of the power states includes a reserve power state whereby the controller and the on-head detection system are powered off and the first power supply is set in a reserve mode.

In some examples, the standby mode is called a shelf mode.

In certain examples, the reserve power state is called a ship mode. In particular cases, the wearable audio device can remain in the reserve (ship) state for months, for example, up to three months, up to six months, or up to nine months. In various implementations, post-setup settings can be restored from the reserve state.

In particular aspects, detecting an on-head event while in the standby power state restores a default operating mode in the active power state without an intervening user command.

In certain cases, the multiple power states further include a hibernate power state whereby the controller is powered on by the first power supply and not actively controlling the electro-acoustic transducer, and a rate of power usage by the controller is less than a rate of power usage in the active power state.

In certain implementations, the on-head detection system includes a multi-sensor system.

In particular cases, the multi-sensor system includes multiple, independent power supplies.

In certain aspects, the on-head detection system comprises a capacitive sensor.

In some implementations, the on-head detection system comprises at least one of a vibration sensor, an infra-red (IR) sensor, an inertial measurement unit (IMU) or a microphone.

In particular cases, the on-head detection system is programmed to apply a hysteresis factor for mitigating false triggers.

In certain aspects, the multiple power states include a standby power state whereby the controller is powered off and the on-head detection system is powered on by the second power supply, where the wearable audio device is configured to remain in the standby power state for an extended period. In certain cases, while the audio device is in the standby power state only approximately 5 percent to approximately 10 percent of the total battery is consumed.

In particular cases, in response to detecting an on-head event while the wearable audio device is in the standby power state, the on-head detection system triggers activity of the controller and the first power supply without further user interaction.

In certain examples, activity of the controller and the first power supply causes the wearable audio device to restore default operation.

In some implementations, the extended period is at least 15 days.

In particular aspects, the extended period is at least 25 days. In some examples, the extended period is up to approximately 30 days.

In various implementations, a method of controlling the wearable audio device further includes switching between the multiple power states in response to at least one of an elapsed timer or an on-head event determined by the on-head detection system.

In certain examples, distinct timers are used to control switching between distinct power states.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures:

FIG. 4 is a chart illustrating power states for operation of a wearable audio device according to various implementations.

Figure 1:
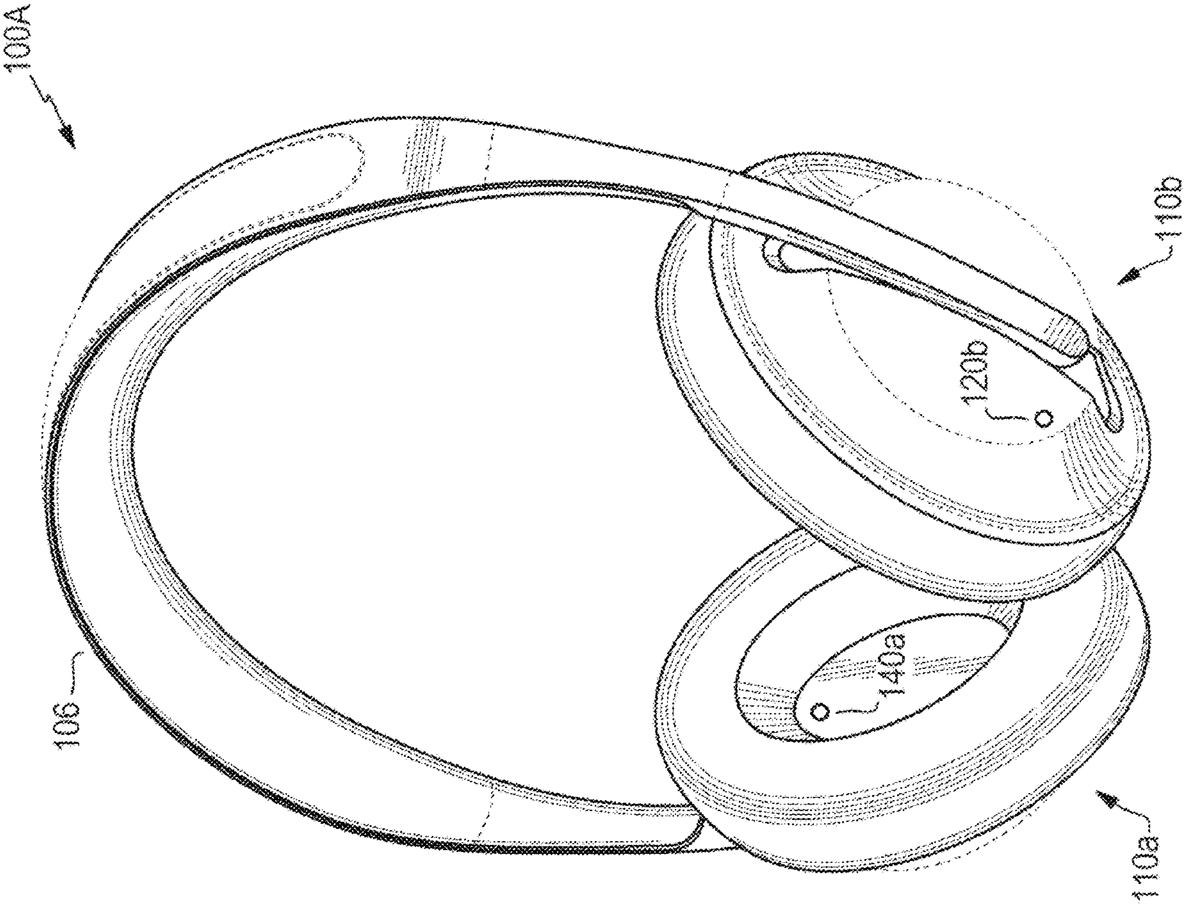
FIG. 1 is a perspective view of one example wearable audio device (or, headset) according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

Various disclosed implementations include wearable audio devices and approaches for controlling such devices. In particular cases, a wearable audio device is configured to operate in multiple power states, and includes two (or more) power supplies for enabling power management in distinct states. In certain of these cases, a first power supply is coupled with a controller and a second power supply is coupled with an on-head detection system. The second power supply is independent of the first power supply. In particular implementations, the power states include a standby power state where the controller is powered off and the on-head detection system is powered by the second power supply.

Commonly labeled components in the FIGURES are considered to be substantially equivalent components for the purposes of illustration, and redundant discussion of those components is omitted for clarity.

Various disclosed implementations relate to managing power states in audio devices. Some example approaches for managing power states in audio devices are described in U.S. patent application Ser. No. 18/371,144 (Adaptive Interface in Active Noise Reduction (ANR) Headset, filed Sep. 21, 2023), U.S. patent application Ser. No. 17/858,004 (Wearable Audio Device Placement Detection, filed Jul. 5, 2022), U.S. Pat. No. 11,202,137 (Wearable Audio Device Placement Detection, filed May 25, 2020), and U.S. Pat. No. 10,812,888 (Wearable Audio Device with Capacitive Touch Interface, filed Jul. 26, 2018), each of which is entirely incorporated by reference herein.

Figure 2:
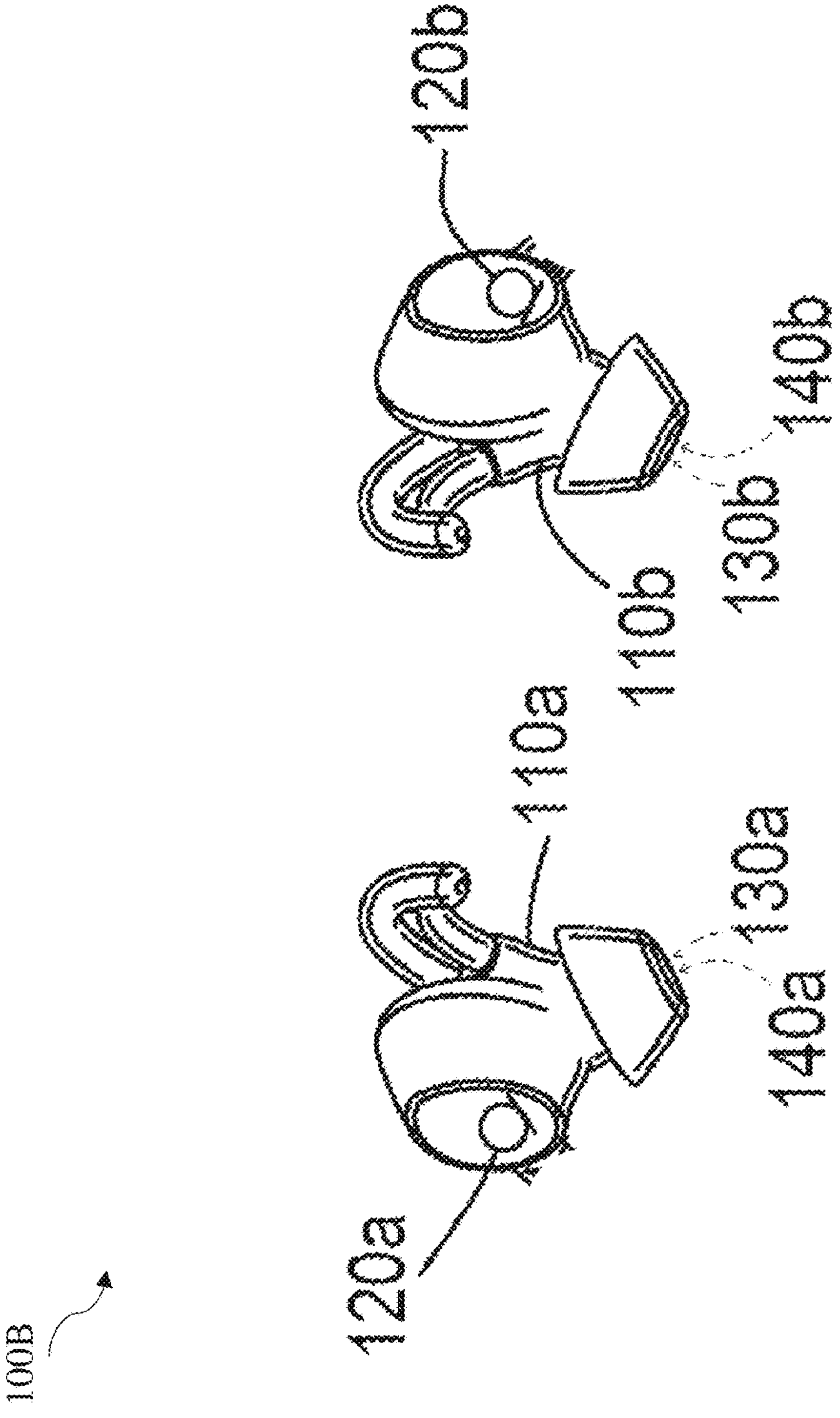
FIG. 2 is a perspective view of another example wearable audio device (or, headset) according to various implementations.

FIGS. 1 and 2 illustrate two example headsets 100A, 100B, which can also be referred to as wearable audio devices. These headsets 100A, 100B are merely illustrative of two of the various form factors of wearable audio device that are compatible with the implementations. Additional types of wearable audio devices can be beneficially employed with the various disclosed implementations, including for example, open-ear audio devices, on-ear audio devices, over-ear audio devices, on-head audio devices, audio eyeglasses, etc. In the examples shown herein, each headset 100 includes a right earpiece 110*a* and a left earpiece 110*b*. Headset 100A is shown intercoupled by a supporting structure 106 (e.g., a headband, neckband, etc.) to be worn by a user, which is optional in headset 100B. In some examples, two earpieces 110 may be independent of each other, not intercoupled by a supporting structure. Each earpiece 110 may include one or more microphones, such as a feedforward microphone 120 and/or a feedback microphone 140. The feedforward microphone 120 may be configured to sense acoustic signals external to the earpiece 110 when properly worn, e.g., to detect acoustic signals in the surrounding environment before they reach the user's ear. The feedback microphone 140 may be configured to sense acoustic signals internal to an acoustic volume formed with the user's ear when the earpiece 110 is properly worn, e.g., to detect the acoustic signals reaching the user's ear. Each earpiece also includes a driver 130, which is an acoustic transducer for conversion of, e.g., an electrical signal, into an acoustic signal that the user may hear. In various examples, one or more drivers may be included in an earpiece, and an earpiece may in some cases include only a feedforward microphone or only a feedback microphone.

While the reference numerals 120 and 140 are used to refer to one or more microphones, the visual elements illustrated in the figures may, in some examples, represent an acoustic port wherein acoustic signals enter to ultimately reach such microphones, which may be internal and not physically visible from the exterior. In examples, one or more of the microphones 120, 140 may be immediately adjacent to the interior of an acoustic port, or may be removed from an acoustic port by a distance, and may include an acoustic waveguide between an acoustic port and an associated microphone.

Figure 3:
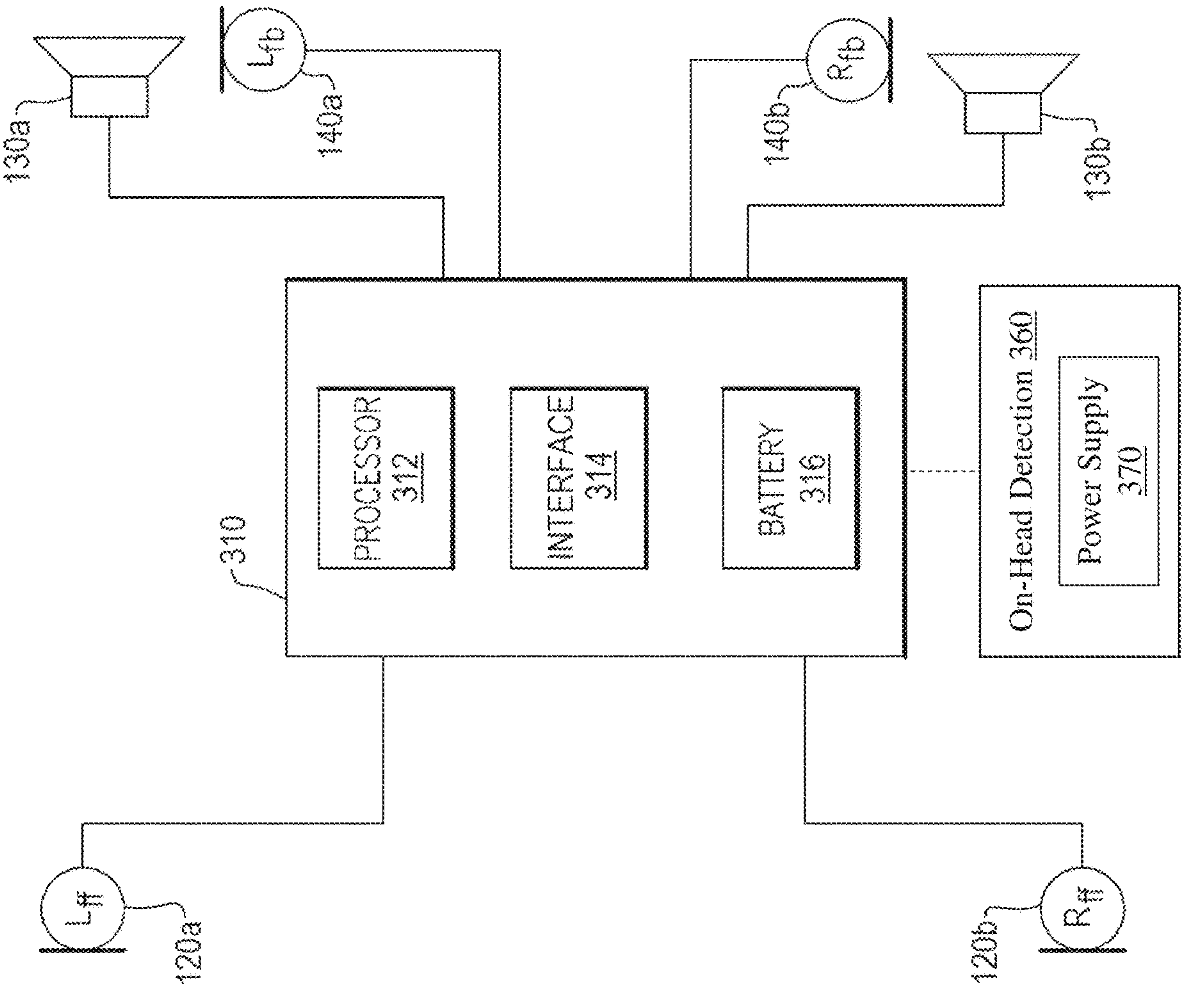
FIG. 3 is a schematic block diagram of an example audio processing system and on-head detection system that may be incorporated into audio systems according to various implementations.

Shown in FIG. 3 is an example of a controller (or, processing unit) 310 that may be physically housed somewhere on or within the headset 100. The controller (processing unit) 310 may include a processor 312, an audio interface 314, and a power supply (e.g., battery) 316. The processing unit 310 may be coupled to one or more feedforward microphone(s) 120, driver(s) 130, and/or feedback microphone(s) 140, in various examples. In various examples, the interface may be a wired or a wireless interface for receiving audio signals, such as a playback audio signal or program content signal, and may include further interface functionality, such as a user interface for receiving user inputs and/or configuration options. In various examples, the battery 316 may be replaceable and/or rechargeable. In various examples, the processing unit 310 may be powered via means other than or in addition to the battery 316, such as by a wired power supply or the like. In some examples, a system may be designed for noise reduction only and may not include an interface 314 to receive a playback signal.

In addition to the controller 310, the headset 100 can also include an on-head detection system 360, which can be connected with the controller 310. In various implementations, the on-head detection system 360 includes a microcontroller (e.g., including one or more processors) and one or more sensors for detecting on-head (and in some cases, doff) events. In particular cases, the on-head detection system includes memory comprising program code (e.g., power management state code) for controlling a power state of the headset 100 according to various implementations. As described herein, the on-head detection system 360 can be configured to communicate with the controller 310 (e.g., processor 312) to trigger transitions between power states. On-head events as described herein can include donning or doffing the headset 100, as well as adjusting the fit of the headset on the head or ears. As noted herein, the on-head detection system 360 can deploy one or more sensors to detect an on-head event, which in various implementations, can be used to control a power state of the headset 100.

In certain example implementations, the on-head detection system 360 can include a capacitive sensor. In various implementations, the on-head detection system 360 includes at least one power supply 370 that is separate from power supply 316. In particular implementations, power supply 370 includes a battery for providing power to the on-head detection system 360 under particular conditions, described further herein. In a particular implementation, the on-head detection system 360 includes a capacitive sensing system with dedicated power supply 370. Certain aspects of capacitive sensing systems are described in U.S. patent application Ser. No. 17/823,372 (Ultrasonic Touch Sensor, filed Aug. 30, 2022), the entire contents of which are incorporated by reference herein.

In some cases, the on-head detection system 360 is configured to communicate with the controller 310, enabling additional functions, e.g., as described in U.S. patent application Ser. No. 17/858,004 (Wearable Audio Device Placement Detection), previously incorporated by reference herein. In additional example implementations, on-head detection system 360 can be configured to determine whether the headset 100 is on the user's head, off the user's head, and/or still being handled by the user. In certain cases, the on-head detection system 360 can include, or otherwise use inputs from microphones 120, 140 to determine whether the headset 100 is located on the user's head. In additional cases, the on-head detection system 360 can include at least one of a vibration sensor, an infra-red (IR) sensor, an inertial measurement unit (IMU) or one or more microphones (e.g., microphones 120, 140). In further implementations, the on-head detection system 360 can include, or otherwise use inputs from an orientation sensor and/or a proximity sensor. In various implementations, the on-head detection system 360 includes a multi-sensor system, e.g., using inputs from capacitive sensor(s), proximity sensor(s), orientation sensor(s), and/or microphones 120, 140 located at the headset 100. In particular cases, the multi-sensor on-head detection system 360 includes multiple, independent power supplies 420. For example, two or more on-head detection sensors can each include an independent power supply 370.

As noted herein, the headset 100 can be configured to operate in multiple power states. For example, the headset 100 can be configured to operate in three, four, five, or more distinct power states. In a particular implementation, multiple power states includes at least three distinct power states, e.g., not including a reset power state.

FIG. 4 is a chart 400 illustrating distinct power states for operation of the headset 100 according to various implementations. As shown, in some implementations the headset 100 has four, or in some cases, five distinct power states. A first one of the power states (1) includes an active power state. In the active power state, the controller 310 is powered on by the first power supply 316 and actively controlling the electro-acoustic transducer(s) 130. In this active state (1), for example, the headset 100 is outputting audio and/or performing noise-cancelation functions with the transducer(s) 130. In certain of these cases, the on-head detection system 360 is powered on in the first power state.

A second one of the power states (2) includes a standby power state, also referred to as a "shelf" mode. In the standby power state, the controller 310 is powered off and the on-head detection system 360 is powered on by the second power supply 370.

A third one of the power states (3) includes a reserve power state, also referred to as a "ship" mode. In the reserve power state, the controller 310 and the on-head detection system 370 are powered off and the first power supply 316 is set in a reserve mode. In particular cases, the headset 100 can remain in the reserve (ship) state for months, for example, up to three months, up to six months, or up to nine months. In various implementations, post-setup settings can be restored from the reserve state.

In additional, optional implementations, the headset 100 can enter another power state prior to the standby (shelf) state. In certain of these cases, the additional power state includes a hibernate power state (2A). In the hibernate power state, the controller 310 is not actively controlled, but is powered by the first power supply 316. In the hibernate state, the rate of power usage of the first power supply 316 is less than a rate of power usage in the active power state (1).

In particular cases, the controller 310 and the on-head detection system 360 are configured to operate in concert to manage the various power states and beneficially extend the life of the first power supply 316 to operate the controller 310. Various particular implementations beneficially employ the standby (shelf) mode to conserve the first power supply 316 while remaining responsive to user interaction, e.g., an on-head event. For example, while in the standby power state, and in response to detecting an on-head event, the headset 100 is configured to restore a default operating mode in the active power state without an intervening user command. That is, the standby power state enables restoration of the default operating mode in the active power state based on detecting an on-head event, without an intervening user command. In other terms, resuming active power state operation can be performed in direct response to the detected on-head event during the standby power state. In such cases, the on-head detection system 360 remains active (powered by power supply 370) for an extended period to be responsive to the on-head event. If the on-head detection system 360 detects the on-head event while in the standby mode, the on-head detection system 360 sends a signal to the controller 310 to activate and restore the default operating mode (including power supply from battery 316).

In certain aspects, the headset 100 is configured to remain in the standby power state for an extended period. In particular implementations, the extended period is at least 15 days. In further examples, the extended period is at least 25 days. In certain examples, the extended period is up to approximately 30 days. In certain cases, while the headset 100 is in the standby power state for the extended period, only approximately 5 percent to approximately 10 percent of the total battery power (from the collective power supplies 316, 370) is consumed. In contrast, the hibernate state (2A) consumes approximately 5 percent to approximately ten percent of the total battery power (from the collective power supplies 316, 370) of the headset 100 in a 24-hour period. In particular cases, the standby power state consumes approximately 5 percent, or approximately 3 percent, of the total battery power consumed by the hibernate state over a 24-hour period.

As noted herein, in particular cases, in response to detecting an on-head event (with on-head detection system 360) while the headset 100 is in the standby power state, the on-head detection system 360 triggers activity of the controller 310 and the first power supply 316 without further user interaction. In certain examples, activity of the controller 310 and the first power supply 316 causes the headset 100 to restore default, or last active usage operation.

In some implementations, the on-head detection system 360 is programmed to apply a hysteresis factor for mitigating false triggers. In such cases, the on-head detection system 360 is configured to introduce a hysteresis factor (e.g., delay) of several hundred milliseconds up to approximately one second, or in particular cases, up to approximately 1.25 seconds.

In particular implementations, the controller 310 (and in certain cases, on-head detection system 360) are configured to control the headset 100 by switching between the power states (FIG. 4), e.g., in response to an elapsed timer and/or an on-head event as detected by the on-head detection system 360. In some examples, distinct timers are used to switch between power states 1-2, 1-2A, 2A-2, 2-3, and/or 3-4.

In one example power state flow, the headset 100 progresses from the active (1) state to the hibernate (2A) state after the controller 310 does not detect activity (e.g., user interaction) for a period, e.g., several minutes up to approximately 15 minutes. In certain cases, the active state has a timer that is triggered by detection of a doff event, a button press, a user interface command, etc. After expiration of the active state timer, the headset 100 can progress to the hibernate state. The headset 100 can remain in the hibernate state for a period (or, hibernate period) greater than the active state (without detected user interaction), e.g., approximately 2-3 hours. In some cases, the standby mode (2) is triggered after the headset 100 is in hibernate mode for the hibernate period. In various implementations, the hibernate state (2A) is optional, such that the headset 100 can progress directly from the active state (1) to the standby state (2) after the active state timer has expired. In either case, as noted herein, the headset 100 can remain in the standby mode (2) without detecting activity (e.g., user interaction such as an on-head event) for an extended period (or, standby period), e.g., at least 15 days. In further examples, the extended period is at least 25 days. In certain examples, the extended period is up to approximately 30 days. After expiration of the standby period without detecting activity, the headset 100 enters the reserve (ship) state (3), where it can remain for a reserve period of months, e.g., up to approximately three months, approximately six months, or approximately nine months.

As noted herein, the headset 100 can include a standby (shelf) state that is enabled by the on-head detection system 360 with a separate (e.g., dedicated) power supply 370. In contrast to conventional wearable audio devices, the headset 100 is configured to remain in the standby state for an extended period, e.g., at least 5, 10, 15, 20, or 25 days. In the standby state, the headset 100 does not engage the power supply 316 to power the processor 312, and is configured to respond to an on-head event (e.g., as detected by on-head detection system 360) to restore the headset 100 to the active state (e.g., triggering activation of the controller 310, which can include outputting audio according to default or last-usage settings). In some conventional devices, returning to the active state from a hibernate mode or deeper sleep mode requires a button press, power cycle, and/or activating the device through a connected device (e.g., an application running on a smart device). In some such conventional devices, the user is required to take multiple actions to restore the active state, e.g., power cycling the device, opening an application on a smart device, and selecting or resuming an output command. In contrast to those conventional devices and approaches, the headset 100 is configured to operate in a standby state and respond to an on-head event detected by the on-head detection system 360 by immediately (e.g., accounting for hysteresis factor) restoring the active power state. In further contrast to conventional devices and approaches, the headset 100 is configured to remain in the standby state for an extended period, e.g., for weeks. In practice, a user can effectively leave the headset 100 "on the shelf," or otherwise resting in a location for several days, or several weeks, don the headset 100, and restore the active power state (e.g., triggering output of audio). The disclosed headsets 100 and approaches can significantly extend the battery life (e.g., battery 316) of the device relative to conventional wearable audio devices, while remaining responsive to user interaction.

As noted herein, various implementations include a headset with an on-head detection system that has an independent power supply configured to enable an extended standby power state. The approaches and devices disclosed herein can enable a quick response to an on-head event even when a device has been sitting for days or weeks without user interaction. The technical effect of such approaches and devices is to enhance responsiveness to user commands, reduce power usage, and/or extend battery life of the headset.

The controller(s) in the headset 100 can execute instructions (e.g., software), including instructions stored in a memory or in a secondary storage device (e.g., a mass storage device). The controller(s) in the headset 100 may be implemented as a chipset of chips that include separate and multiple analog and digital processors. The controllers in headset 100 may provide, for example, for coordination of other components in the ANR headpiece, such as control of user interfaces, applications run by additional electronics in the ANR headpiece, and network communication by the ANR headpiece. The controller in the headset 100 may manage communication with a user through a connected display and/or a conventional user input interface.

The systems and methods disclosed herein may include or operate in, in some examples, headsets, headphones, hearing aids, or other personal audio devices, as well as acoustic noise reduction systems that may be applied to home, office, or automotive environments. Throughout this disclosure the terms "headset," "headphone," "earphone," and "headphone set" are used interchangeably, and no distinction is meant to be made by the use of one term over another unless the context clearly indicates otherwise. Additionally, aspects and examples in accord with those disclosed herein are applicable to various form factors, such as in-ear transducers or earbuds and on-ear or over-ear headphones, and others.

Examples disclosed may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For various components described herein, a designation of "a" or "b" in the reference numeral may be used to indicate "right" or "left" versions of one or more components. When no such designation is included, the description is without regard to the right or left and is equally applicable to either of the right or left, which is generally the case for the various examples described herein. Additionally, aspects and examples described herein are equally applicable to monaural or single-sided personal acoustic devices and do not necessarily require both of a right and left side.

Examples of the headphones described herein are not limited in application to the details of construction and the arrangement of components set forth in the following description or illustrated in the accompanying drawings. The headphones are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

The term "approximately" as used with respect to values herein can allot for a nominal variation from absolute values, e.g., of several percent or less. Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). Similarly, the term "in response to" is used to indicate any of its ordinary meanings, including "in response to at least."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Any incorporation by reference of a portion of a document shall also be understood to incorporate definitions of terms or variables that are referenced within the portion, where such definitions appear elsewhere in the document, as well as any figures referenced in the incorporated portion.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawings.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

We claim:

1. A wearable audio device comprising:
- an electro-acoustic transducer for providing an audio output;
- a controller coupled with the electro-acoustic transducer;
- a first power supply coupled with the controller;
- an on-head detection system coupled with the controller; and
- a second power supply coupled with the on-head detection system, the second power supply being independent of the first power supply,
- wherein the wearable audio device is operable in multiple power states.

2. The wearable audio device of claim 1, wherein the multiple power states include at least three distinct power states.

3. The wearable audio device of claim 2, wherein:
- a first one of the power states includes an active power state whereby the controller is powered on by the first power supply and actively controlling the electro-acoustic transducer,
- a second one of the power states includes a standby power state whereby the controller is powered off and the on-head detection system is powered on by the second power supply, and
- a third one of the power states includes a reserve power state whereby the controller and the on-head detection system are powered off and the first power supply is set in a reserve mode.

4. The wearable audio device of claim 3, wherein detecting an on-head event while in the standby power state restores a default operating mode in the active power state without an intervening user command.

5. The wearable audio device of claim 4, wherein the on-head detection system comprises a microphone.

6. The wearable audio device of claim 3, wherein the multiple power states further include a hibernate power state whereby the controller is powered on by the first power supply and not actively controlling the electro-acoustic transducer, and a rate of power usage by the controller is less than a rate of power usage in the active power state.

7. The wearable audio device of claim 3, wherein in the standby power state, the controller is configured to resume active power state operation in direct response to the on-head detection system detecting an on-head event, wherein the standby power state is configured to be maintained for an extended period of at least 15 days.

8. The wearable audio device of claim 7, wherein while in the standby power state for the extended period, only approximately 5 percent to approximately 10 percent of total battery power from the first power supply and the second power supply is consumed.

9. The wearable audio device of claim 1, wherein the on-head detection system includes a multi-sensor system including multiple, independent power supplies.

10. The wearable audio device of claim 1, wherein the on-head detection system comprises a capacitive sensor.

11. The wearable audio device of claim 1, wherein the on-head detection system comprises at least one of a vibration sensor, an infra-red (IR) sensor, an inertial measurement unit (IMU) or a microphone.

12. The wearable audio device of claim 1, wherein the on-head detection system is programmed to apply a hysteresis factor for mitigating false triggers.

13. The wearable audio device of claim 1, wherein the multiple power states include a standby power state whereby the controller is powered off and the on-head detection system is powered on by the second power supply,
- wherein the wearable audio device is configured to remain in the standby power state for an extended period.

14. The wearable audio device of claim 13, wherein in response to detecting an on-head event while the wearable audio device is in the standby power state, the on-head detection system triggers activity of the controller and the first power supply without further user interaction.

15. The wearable audio device of claim 14, wherein activity of the controller and the first power supply causes the wearable audio device to restore default operation.

16. The wearable audio device of claim 13, wherein the extended period is at least 15 days.

17. The wearable audio device of claim 16, wherein the extended period is at least 25 days.

18. A method of controlling the wearable audio device of claim 1, further comprising switching between the multiple power states in response to at least one of an elapsed timer or an on-head event determined by the on-head detection system.

19. The wearable audio device of claim 1, wherein the on-head detection system comprises at least one feedforward microphone and at least one feedback microphone.

20. A method of controlling a wearable audio device including, an electro-acoustic transducer for providing an audio output, a controller coupled with the electro-acoustic transducer, a first power supply coupled with the controller, an on-head detection system coupled with the controller, and a second power supply coupled with the on-head detection system, the second power supply being independent of the first power supply, the method comprising:

switching between power states in response to at least one of an elapsed timer or an on-head event determined by the on-head detection system, wherein:

a first one of the power states includes an active power state whereby the controller is powered on by the first power supply and actively controlling the electro-acoustic transducer, a second one of the power states includes a standby power state whereby the controller is powered off and the on-head detection system is powered on by the second power supply, and a third one of the power states includes a reserve power state whereby the controller and the on-head detection system are powered off and the first power supply is set in a reserve mode, and wherein detecting an on-head event while in the standby power state restores a default operating mode in the active power state without an intervening user command.

* * * * *